United States Patent Office

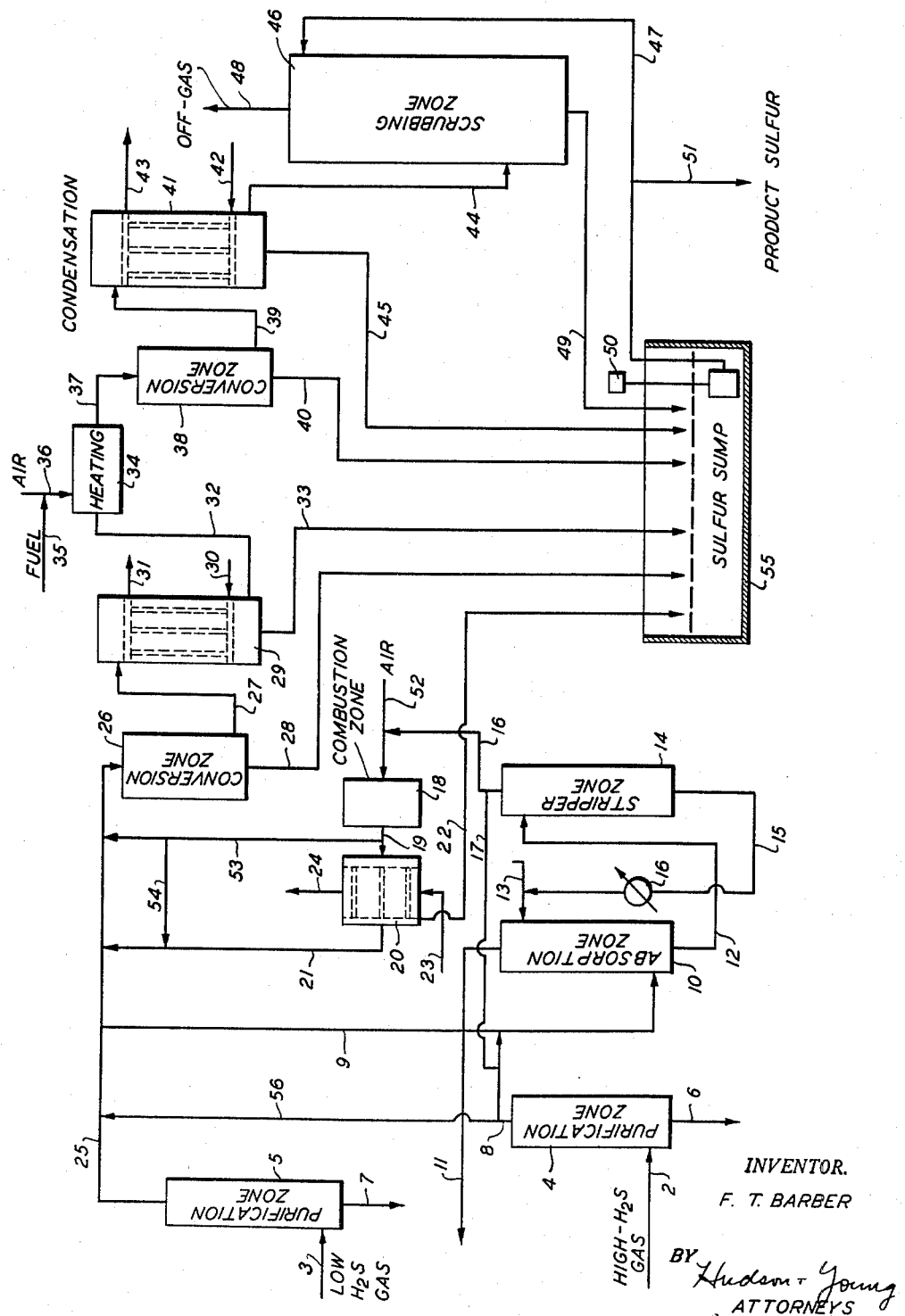

2,958,586
Patented Nov. 1, 1960

2,958,586

PROCESS FOR PRODUCING SULFUR FROM ACID GASES

Franklin T. Barber, Bartlesville, Okla., assignor to Phillips Petroleum Company, a corporation of Delaware Filed May 6, 1952, Ser. No. 286,380

5 Claims. (Cl. 23—225)

This invention relates to the production of elemental sulfur from gases containing hydrogen sulfide. In one aspect it relates to a novel process for obtaining an increased yield of elemental sulfur from gases containing hydrogen sulfide and hydrocarbons. In another aspect, it relates to a method of minimizing side reactions in a process wherein elemental sulfur is produced by the reaction of hydrogen sulfide with sulfur dioxide. In another aspect, it relates to the prevention of side reactions during the oxidation of hydrogen sulfide to sulfur dioxide which side reactions result in an undesirable consumption and loss of sulfur.

It is known in the art to recover sulfur from hydrocarbon gases, such as natural gas, containing hydrogen sulfide by oxidizing one-third of such a gas to convert the hydrogen sulfide to sulfur dioxide and subsequently reacting the oxidized gas with the remaining two-thirds of the original gas. The $H_2S$—$SO_2$ reaction is ordinarily conducted in the presence of a catalyst, such as bauxite, at a temperature in the range 300–700° F.

One difficulty connected with prior art processes of the type described above is that, when the hydrogen sulfide is converted to sulfur dioxide by combustion, the hydrocarbon accompanying the hydrogen sulfide into the combustion zone reacts in such a manner that side reactions take place. These side reactions result in the formation of carbonyl sulfide and carbon disulfide. Only part of the carbonyl sulfide is converted to sulfur during the ensuing $H_2S$—$SO_2$ reaction, and substantially none of the carbon disulfide is converted to sulfur. Thus, the side reactions decrease the overall yield of sulfur obtainable in the prior art processes.

In the prior art, it has been attempted to solve the side reaction problem by controlling the $H_2S$—$SO_2$ reaction temperature at an optimum value. However, since the $H_2S$—$SO_2$ reaction produces its highest yield of sulfur at a temperature different from that at which the maximum conversion of the carbonyl sulfide to sulfur takes place, the prior art solution of the side reaction problem is, at best, a compromise.

Another difficulty stemming from the presence of hydrocarbon in the combustion zone is the high heat liberation resulting from the combustion the hydrocarbon. This heat must be removed from the combustion gas prior to the $H_2S$—$SO_2$ reaction. Thus, the throughput of many sulfur plants has been limited by the heat-removal capacity as applied to the combination zone effluent.

This invention solves the heat removal and side reaction problems by preventing or minimizing the occurrence of side reactions and excess heat liberation, rather than attempting to correct for such difficulties after they have occurred.

According to this invention, a gas stream containing hydrogen sulfide and hydrocarbons is treated to separate the hydrogen sulfide and obtain a hydrogen sulfide concentrate containing less than 10 percent of hydrocarbons; the separated hydrogen sulfide is converted to sulfur dioxide; and the sulfur dioxide is reacted with a hydrogen sulfide-containing gas to produce elemental sulfur.

In accordance with one embodiment of the invention, a gas containing hydrogen sulfide and hydrocarbons is divided into two parts; one part is treated to remove hydrocarbons and obtain a hydrogen sulfide concentrate containing less than 10 percent of hydrocarbons; the concentrate is converted to sulfur dioxide; and the sulfur dioxide is reacted with the remainder of the original gas to produce elemental sulfur.

The separation or concentration of the hydrogen sulfide in the stream to be sent to the oxidation zone can be effected by any suitable means, such as adsorption or absorption followed by stripping. For example, the hydrogen sulfide can be preferentially absorbed in a solvent such as an alkanolamine of the type represented by monoethanolamine, diethanolamine, and triethanolamine. Alternatively, adsorption of the $H_2S$ on activated carbon or silica gel can be used. Purely chemical separation of the hydrogen sulfide can also be utilized, e.g. by formation of a metal sulfide followed by regeneration of the hydrogen sulfide.

When a solvent or an adsorbent is used for separating the hydrogen sulfide from the hydrocarbons, part of the hydrocarbons is also absorbed or adsorbed and accompanies the hydrogen sulfide through the adsorption or absorption system and appears as a contaminant in the concentrated hydrogen sulfide. This contamination occurs to a greater extent when the gas contains unsaturated hydrocarbons such as ethylene, acetylene, or butadiene than when the hydrocarbons are substantially solely saturated hydrocarbons such as methane.

According to this invention, the hydrocarbon content of the hydrogen sulfide stream passed to the oxidation zone is maintained at less than 10 volume percent, preferably less than 5 volume percent, and, more desirably, less than 2 volume percent. This hydrocarbon concentration can be maintained by proper refluxing and reboiling in the absorption zone, by maintaining proper temperature gradients in the adsorption zone when adsorption is used, or by utilizing several stages of adsorption, absorption and/or stripping. When large amounts of unsaturated hydrocarbons are present in the original $H_2S$-containing gas, they can be preliminarily removed by fractionation, polymerization, and the like. Natural gas, of course, contains substantially no unsaturates. Refinery gases often do contain such unsaturates, which can be removed as previously described if such removal is desired.

By maintaining the hydrocarbon concentration in the gas entering the $SO_2$-production (oxidation) zone at the specified value, side reactions, such as those resulting in the formation of COS and/or $CS_2$ are minimized or prevented, and the overall yield of elemental sulfur from the $H_2S$—$SO_2$ reaction is increased.

The attached flow diagram illustrates one embodiment of the invention.

A high-$H_2S$ gas, i.e. one containing less than 10 percent of hydrocarbons enters the system through inlet 2. A low-$H_2S$ gas, i.e. one containing more than 10 percent hydrocarbons and, in some cases containing as high as 70 percent of hydrocarbons, enters the system through inlet 3. These two gas streams enter preliminary purification zones 4 and 5 respectively, wherein any undesired impurities, such as moisture, entrained liquids, solids, etc., can be removed. Impurities are withdrawn through outlets 6 and 7. The preliminary purified high-$H_2S$ gas is passed through conduits 8 and 9 to absorption zone 10. Part or all of the gas, particularly when the hydrocarbon content is quite low, e.g. less than 2 percent, can be by-passed around absorption zone 10 through conduit 17 if so desired.

A solvent, such as ethanolamine, enters absorption zone 10 through inlet 13 and contacts the gas, removing the H₂S. Residual gas containing hydrocarbons and freed of H₂S, is withdrawn through outlet 11. Enriched solvent is passed through conduit 12 to stripping zone 14, wherein the absorbed hydrogen sulfide is stripped from the solvent by heating and/or pressure reduction. Stripped solvent is recycled through conduit 15, cooler 16, and inlet 13 to absorption zone 10.

Concentrated hydrogen sulfide, containing only small amounts of hydrocarbons, in any event not greater than 10 percent, passes through conduit 16 to combustion zone 18. Sufficient air to convert substantially all of the H₂S to SO₂ is added through inlet 52. Oxygen-enriched air or pure oxygen can, of course, be used if desired. Combustion gas, containing sulfur dioxide, passes through conduit 19 to cooling zone 20, which can be a waste-heat boiler, wherein the combustion gas is cooled from a temperature in the range 1500 to 2500° F. to a substantially lower temperature. Any elemental sulfur condensing in cooling zone 20 is passed through conduit 22 to sulfur sump 55. Water enters cooling zone 20 through inlet 23, and steam is withdrawn through outlet 24.

Cooled SO₂-containing gas in conduit 21 is mixed with the low-H₂S gas in conduit 25 in such proportions that a molar excess of H₂S to SO₂ of approximately 2:1, is obtained and that a mixture having a temperature in the range 350 to 700° F. results. Added flexibility of temperature adjustment can be obtained by by-passing part of the high-temperature combustion gas around cooling zone 20 through conduit 53 and conduit 54 or through conduit 53 alone. The gas in line 25 can also be heated or cooled, as desired.

The H₂S—SO₂ mixture is passed through conversion zone 26, which contains a suitable metal oxide catalyst, such as bauxite, and wherein the reaction $$2H_2S + SO_2 \rightarrow 3S + 2H_2O$$

takes place. Any elemental sulfur condensing in conversion zone 26 is passed through conduits 28 to sulfur sump 55.

Effluent gas from zone 26 is passed through conduit 27 to condensation zone 29 wherein elemental sulfur vapor is condensed by indirect heat exchange with cooling water, which enters through inlet 30. Steam and/or hot water is withdrawn through outlet 31. Condensation zone 29 can be provided with coolant tubes and headers, indicated by broken lines in the drawing. Liquid sulfur is passed through conduit 33 to sulfur sump 55.

Gas containing sulfur vapor, together with hydrogen sulfide and sulfur dioxide, is passed to heating zone 34, wherein the temperature of the gas is increased to a value in the range 400 to 600° F., by means of air and fuel gas, which enters through inlets 36 and 35, respectively.

Heated gas is passed through conduit 37 to a second conversion zone 38, similar to conversion zone 26. In zone 38, residual hydrogen sulfide and sulfur dioxide are converted to elemental sulfur, as previously described in connection with conversion zone 26. Any sulfur condensing in zone 38 is passed through conduit 40 to sulfur sump 55.

Effluent gas from zone 38 is passed through conduit 39 to condensation zone 41, wherein elemental sulfur vapor is condensed. Zone 41 is similar, in construction and operation to zone 29. Condensed liquid sulfur is passed through conduit 45 to sulfur sump 55.

Residual gas, which ordinarily contains small amounts of sulfur vapor, is passed through conduit 44 to scrubbing zone 46, wherein it is scrubbed with liquid sulfur, supplied by pump 50 through conduit 47. In scrubbing zone 46, substantially all of the remaining sulfur vapor is removed by the liquid sulfur, which is returned to sump 55 through conduit 49. Off-gas is removed through outlet 48 for hydrocarbon recovery or usage or for any other desired purpose. Product sulfur is withdrawn through outlet 51.

Although two stages of H₂S—SO₂ reaction are shown in the drawing, a larger or smaller number of stages can be used as desired. Ordinarily, two are sufficient.

When no low-H₂S stream is available, or when such stream is available in insufficient volume, part of the high-H₂S stream can be passed through conduit 56 to conduit 25 for utilization of the H₂S in the H₂S—SO₂ reaction.

Similarly, when no high-H₂S stream is available, or when such stream is available in insufficient volume with respect to the low-H₂S stream, part of the low-H₂S stream can be passed through conduit 9 to absorption zone 10 for concentration of the H₂S.

It is ordinarily advantageous to conduct the H₂S concentration at a low pressure (e.g. not greater than 5 atmospheres), when adsorption or absorption is used, since at higher pressures greater amounts of hydrocarbons are adsorbed or absorbed together with the H₂S. Thus, low pressures generally favor high selectivity.

However, when the sulfur-free hydrocarbon off-gas is to be transported by pipeline and is initially present at high pressure, it is uneconomical to reduce the pressure, remove H₂S, and recompress. In such a case, the H₂S concentration can be effected at the high pressure of the gas, sufficient reboiling, stepwise absorption, or stepwise stripping and being provided to obtain the H₂S in a desired degree of purity. Also, when the H₂S-containing gas is available only at high pressure, a purely chemical concentration method, such as a sodium phenolate process or other metal sulfide formation process, followed by H₂S regeneration can be used. Such a chemical method is also highly satisfactory when the H₂S-containing gas contains unsaturated hydrocarbons.

Absorption or adsorption at high pressures, however, has the advantage of enabling use of smaller equipment.

Several hydrogen sulfide streams containing different amounts of hydrocarbons were passed through an air oxidation unit wherein the hydrogen sulfide was oxidized to sulfur dioxide. The effluent oxidized gas, as well as the feed gas, was analyzed. Tables I and II show the effect of increasing hydrocarbon content on carbon disulfide and carbonyl sulfide formation. The term "hydrocarbons in feed" represents hydrocarbons predominantly, but also includes minor amounts of other combustible carbon compounds.

*Table I*

| Hydrocarbons in feed, lb.-atoms C per unit of time: | CS₂ in effluent, moles per unit of time |
|---|---|
| 4.1 | 0.8 |
| 4.7 | 1.0 |
| 6.0 | 1.5 |
| 8.0 | 2.1 |
| 10.0 | 2.5 |
| 19.0 | 3.7 |

*Table II*

| Hydrocarbons in feed, lb.-atoms C per unit of time: | COS in effluent, moles per unit of time |
|---|---|
| 5.0 | 1.3 |
| 7.0 | 2.0 |
| 23.0 | 4.6 |

The above data show that increasing amounts of sulfur are converted to carbon disulfide and carbonyl sulfide as the hydrocarbon content of the feed to the SO₂-production zone is increased.

According to this invention, the loss of sulfur by conversion to COS and CS₂ is minimized by substantially excluding hydrocarbons from the SO₂-production step of the process.

The precise mechanism of formation of carbonyl sulfide and carbon disulfide in the combustion zone is not completely understood. It may involve the intermediate formation of carbon monoxide. It has been found desirable, in accordance with this invention, to exclude carbon monoxide from the $SO_2$-production zone. Exclusion of hydrocarbon results in exclusion of carbon monoxide.

The presence of moisture in the feed gases is known to be undesirable, since it suppresses, by mass action, the formation of sulfur from $H_2S$ and $SO_2$. Purification zones 4 and 5 can be used to remove moisture.

The term "high-$H_2S$ gas," as used herein, signifies a gas containing less than 10 volume percent hydrocarbons, the remainder being predominantly hydrogen sulfide. Such gas can contain inert gases, such as nitrogen, which can constitute as high as 45 volume percent of the total gas.

The term "low-$H_2S$ gas" signifies a gas containing from 10 to 70 volume percent of hydrocarbons, the remainder being predominantly hydrogen sulfide. Inert gases, such as nitrogen, can also be present.

Variation and modification are possible within the scope of the specification and claims to this invention, the essence of which is that a gas containing hydrogen sulfide and hydrocarbons is treated to remove some of said hydrocarbons and obtain a concentrated hydrogen sulfide gas containing less than 10 percent of hydrocarbons, said concentrated gas is oxidized to sulfur dioxide, and the sulfur dioxide is reacted with a hydrogen sulfide-containing gas to produce elemental sulfur in increased yield as a result of minimizing side reactions by the substantial exclusion of hydrocarbons from the sulfur dioxide production step. Thus, in place of, or in addition to, scrubbing zone 46, a coalescer can be used to remove the last traces of sulfur from the gas in line 44.

I claim:

1. A process for producing sulfur from a low-$H_2S$ gas containing from 10 to 70 percent of hydrocarbons and a high-$H_2S$ gas containing less than 10 percent of hydrocarbons, which process comprises removing at least part of the hydrocarbons from at least part of said high-$H_2S$ gas to obtain a hydrogen sulfide concentrate, oxidizing the hydrogen sulfide in said concentrate directly to sulfur dioxide, admixing said sulfur dioxide with said low-$H_2S$ gas in an amount corresponding to a molar ratio of $H_2S$ to $SO_2$ of 2:1, reacting the admixture at a temperature in the range 350 to 700° F. in the presence of a bauxite catalyst to produce elemental sulfur, and recovering said elemental sulfur.

2. A process which comprises reducing the hydrocarbon content of a hydrogen sulfide-containing gas stream to less than 2 volume percent and burning the same in the absence of a catalyst with an oxygen-containing gas to convert the hydrogen sulfide directly to sulfur dioxide, cooling a resulting gas stream to condense small amounts of elemental sulfur formed as a by-product of the reaction with said oxygen, recovering said sulfur, mixing said resulting gas stream with a hydrogen sulfide-containing gas having a hydrocarbon content substantially greater than 2 volume percent to obtain a mixed gas in which the molar ratio of $H_2S$ to $SO_2$ is about 2:1, reacting said mixed gas at a temperature in the range 350 to 700° F. in the presence of a metal oxide catalyst which promotes the reaction of hydrogen sulfide with sulfur dioxide to produce elemental sulfur, and recovering said sulfur.

3. A process which comprises removing hydrocarbons from a portion of a gas comprising hydrocarbons and hydrogen sulfide to produce a gaseous stream of hydrogen sulfide containing a minor amount of less than 5 percent of hydrocarbons, oxidizing said streams of hydrogen sulfide directly to sulfur dioxide, admixing said sulfur dioxide with the remaining portion of said gas containing substantially more than 5 percent hydrocarbons to provide a mol ratio of $H_2S$ to $SO_2$ of 2:1, reacting the resulting mixture at a temperature in the range of 350 to 700° F. in the presence of a metal oxide catalyst which promotes the reaction of hydrogen sulfide with sulfur dioxide to produce elemental sulfur, and recovering said elemental sulfur.

4. A process which comprises removing hydrocarbon from a hydrocarbon gas containing hydrogen sulfide to produce a stream of gaseous $H_2S$ containing a minor amount of less than 2 volume percent of hydrocarbon; burning the $H_2S$ in said stream in the absence of a catalyst to convert same directly to $SO_2$; mixing said $SO_2$ with an $H_2S$-containing gas of higher hydrocarbon content than said stream to provide a mol ratio of $H_2S$ to $SO_2$ of about 2:1 and reacting the $SO_2$ and $H_2S$ therein at a temperature in the range of 350 to 700° F. in the presence of a metal oxide catalyst which promotes the reaction of hydrogen sulfide with sulfur dioxide to produce elemental sulfur; and recovering the resulting sulfur.

5. A process which comprises reducing the hydrocarbon content of a hydrogen sulfide-containing gas stream to less than 5 volume percent and burning the same in the absence of a catalyst with an oxygen-containing gas to convert the hydrogen sulfide directly to sulfur dioxide, cooling a resulting gas stream to condense small amounts of elemental sulfur formed as a by-product of the reaction with said oxygen, mixing said resulting gas stream with a hydrogen sulfide-containing gas having a hydrocarbon content substantially greater than 5 volume percent to obtain a mixed gas in which the molar ratio of $H_2S$ to $SO_2$ is about 2:1, reacting said mixed gas at a temperature in the range 350 to 700° F. in the presence of a metal oxide catalyst which promotes the reaction of hydrogen sulfide with sulfur dioxide to produce elemental sulfur, and recovering said sulfur.

References Cited in the file of this patent

UNITED STATES PATENTS

| 1,083,247 | Hall | Dec. 30, 1913 |
| 1,678,630 | Bahr | July 31, 1928 |
| 1,922,872 | Thompson | Aug. 15, 1933 |
| 2,169,379 | Barkholt | Aug. 15, 1939 |
| 2,384,926 | Jones | Sept. 18, 1945 |

FOREIGN PATENTS

| 419,479 | Great Britain | Nov. 13, 1934 |

OTHER REFERENCES

Lange: "Handbook of Chemistry," 5th ed., 1944, pp. 762, 763.